US012795182B2

(12) United States Patent
Hinds

(10) Patent No.: US 12,795,182 B2
(45) Date of Patent: *Nov. 10, 2026

(54) DATA MODEL FOR REPRESENTATION AND STREAMING OF HETEROGENEOUS IMMERSIVE MEDIA

(71) Applicant: TENCENT AMERICA LLC, Palo Alto, CA (US)

(72) Inventor: Arianne Therese Hinds, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/764,735

(22) Filed: Jul. 5, 2024

(65) Prior Publication Data

US 2024/0364943 A1 Oct. 31, 2024

Related U.S. Application Data

(63) Continuation of application No. 17/231,513, filed on Apr. 15, 2021, now Pat. No. 12,069,321.

(Continued)

(51) Int. Cl.

*H04N 21/234* (2011.01)
*G06F 3/01* (2006.01)

(Continued)

(52) U.S. Cl.

CPC ....... *H04N 21/23412* (2013.01); *G06F 3/012* (2013.01); *G06F 3/014* (2013.01);

(Continued)

(58) Field of Classification Search

CPC ......... H04N 21/23412; H04N 21/4223; H04N 21/44218; H04N 21/8146; G06F 3/012; G06F 3/014; H04L 65/75

See application file for complete search history.

(56) References Cited

U.S. PATENT DOCUMENTS 6,674,430 B1 * 1/2004 Kaufman .............. G06T 15/005 345/419
7,149,770 B1 12/2006 Kalva et al.

(Continued)

FOREIGN PATENT DOCUMENTS

EP 4018673 B1 * 1/2025 ............. H04L 65/70
WO 2019/213450 A1 11/2019

(Continued)

OTHER PUBLICATIONS

Office Action dated Jul. 3, 2023 in Japanese Patent Application No. 2022-523682.

(Continued)

*Primary Examiner* — James R Sheleheda

(74) *Attorney, Agent, or Firm* — Sughrue Mion, PLLC

(57) ABSTRACT

A method, computer system, and computer readable medium are provided for displaying video content. An interface to a presentation engine to enable real-time rendering of a plurality of objects is created whereby the plurality of objects are logically organized together through a plurality of scene graphs, and whereby the plurality of scene graphs is organized a media interchange format. Geometry information of the plurality of scene graphs is updated through the interface to a representation engine. The plurality of objects is streamed based on multi-resolution or multi-tesselation of heterogenous visual geometric objects in each of the scene graphs from among the plurality of scene graphs using the media interchange format.

20 Claims, 5 Drawing Sheets

Related U.S. Application Data

(60) Provisional application No. 63/038,591, filed on Jun. 12, 2020.

(51) Int. Cl.

| | |
|---|---|
| ***H04L 65/61*** | (2022.01) |
| ***H04L 65/70*** | (2022.01) |
| ***H04N 21/4223*** | (2011.01) |
| ***H04N 21/442*** | (2011.01) |
| ***H04N 21/81*** | (2011.01) |

(52) U.S. Cl.

CPC .............. *H04L 65/61* (2022.05); *H04L 65/70* (2022.05); *H04N 21/4223* (2013.01); *H04N 21/44218* (2013.01); *H04N 21/8146* (2013.01)

(56) References Cited

U.S. PATENT DOCUMENTS

| | | | | | |
|---|---|---|---|---|---|
| 10,255,302 | B1 | | 4/2019 | Cosic | |
| 10,607,105 | B1 | * | 3/2020 | Papon | G06T 17/005 |
| 10,659,760 | B2 | | 5/2020 | Wang | |
| 10,861,422 | B1 | * | 12/2020 | Seiler | G09G 5/37 |
| 11,436,504 | B1 | * | 9/2022 | Lukarski | G06N 5/04 |
| 12,069,321 | B2 | * | 8/2024 | Hinds | H04L 65/70 |
| 2002/0089508 | A1 | | 7/2002 | Sowizral et al. | |
| 2004/0017385 | A1 | | 1/2004 | Cosman et al. | |
| 2004/0077362 | A1 | | 4/2004 | Chinomi et al. | |
| 2008/0192054 | A1 | * | 8/2008 | Fowler | G06T 15/06<br>345/427 |
| 2016/0307353 | A1 | * | 10/2016 | Ligenza | G06T 13/20 |
| 2018/0373322 | A1 | | 12/2018 | Tennakoon et al. | |
| 2019/0028691 | A1 | * | 1/2019 | Hinds | H04N 21/4518 |
| 2019/0139321 | A1 | | 5/2019 | Kocharlakota et al. | |
| 2021/0392386 | A1 | * | 12/2021 | Hinds | H04N 21/44218 |
| 2024/0364943 | A1 | * | 10/2024 | Hinds | H04N 21/44218 |

FOREIGN PATENT DOCUMENTS

| | | | | | |
|---|---|---|---|---|---|
| WO | 2020/116154 | A1 | | 6/2020 | |
| WO | WO-2021252102 | A1 | * | 12/2021 | H04L 65/70 |

OTHER PUBLICATIONS

Extended European Search Report issued Sep. 12, 2022 in European Patent Application 21823144.7.

Deutsche Telekom AG et al., "ETSI GR ARF 001 V0.0.7", ETSI, 2019, vol. ISG Augmented Reality Framework (ARF), pp. 1-38 (38 pages total).

Qualcomm Incorporation (Rapporteur)1, "FS_XR5G: Permanent document, v0.6.0", 3GPP TSG SA WG-4 Meeting #105, S4-190987, Ljubljana, Slovenia Aug. 8-12, 2019, 77 pages total.

"Immersive Digital Experiences Alliance", IDEA, Apr. 8, 2019, 34pages.

"ETSI—Multi-access Edge Computing—Standards for MEC", 6pages.

"ETSI—Standards for NFV—Network Functions Virtualisation", NFV Solutions, 33pages.

"gITF/README.md at master · KhronosGroup/gITF · GitHub", 140pages.

"ORBX 2 Technical Introduction", Oct. 2013, 9pages.

"IEEE Software Defined Networks", 1page.

"Unity User Manual (2019.4 LTS)", 6pages.

"Universal Scene Description (USD)", 1page.

"Unreal Engine Documentation", 8pages.

"Usdz File Format Specification", 4pages.

International Search Report dated Aug. 12, 2021 in Application No. PCT/US21/30787.

Written Opinion of the International Searching Authority dated Aug. 12, 2021 in Application No. PCT/US21/30787.

WG11 (MPEG)," MPEG-4 Overview—(Maui Version)", ISO/IEC JTC1/SC29/WH11 N3156, Dec. 1999, Maui, pp. 1-57 (57 pages).

Communication dated Jun. 3, 2024 in European Application No. 21 823 144.7.

* cited by examiner

DATA MODEL FOR REPRESENTATION AND STREAMING OF HETEROGENEOUS IMMERSIVE MEDIA

CROSS-REFERENCE TO RELATED APPLICATION

This application is a Continuation of U.S. application Ser. No. 17/231,513 filed Apr. 15, 2021, which claims priority based on U.S. Provisional Application No. 63/038,591 (filed Jun. 12, 2020), the entirety of which is incorporated by reference herein.

FIELD

The present disclosure describes embodiments generally related to immersive media, specially related to a data model and system for representing and streaming heterogeneous immersive media.

BACKGROUND

"Immersive Media" generally refers to media that stimulates any or all human sensory systems (visual, auditory, somatosensory, olfactory, and possibly gustatory) to create or enhance the perception of the user being physically present in the experience of the media, i.e., beyond what is distributed over existing commercial networks for timed two-dimensional (2D) video and corresponding audio. Immersive media is either timed or untimed. Timed media refers to media that is structured and presented according to time. Examples include movie features, news reports, episodic content, all of which are organized according to periods of time. Legacy video and audio are generally considered to be timed media. Untimed media is media that is not structured by time; but rather structured by logical, spatial, and/or temporal relationships. An example would include a video game where the user has control over the experience created by the gaming device. Untimed media may incorporate timed media, for example, in a continuously looped audio or video segment of a scene for a video game. Immersive media-capable devices refer to devices equipped with abilities to access, interpret, and present Immersive Media information from Immersive Media to the user. Such media and devices are heterogeneous in terms of the quantity and formats of data needed to represent immersive information, and numbers and types of network resources required to distribute such media information at scale, i.e., to achieve distribution equivalent to that of legacy video and audio media.

SUMMARY

The techniques described herein allow for creating a unifying data model to represent and stream heterogeneous Immersive Media over commercial networks to service heterogenous end points, including holographic displays and XR headsets. The ability to stream such media is essential to enable real-time distribution of media that capture live events, e.g., sports, concerts, news, user-generated content, and distributed games, for subsequent presentation on a variety of heterogenous end-points.

Embodiments relate to a method, system, and computer readable medium for displaying video content. According to one aspect, a method for displaying video content is provided. The method may include creating an interface to a presentation engine to enable real-time rendering of a plurality of objects whereby the plurality of objects are logically organized together through a plurality of scene graphs, and whereby the plurality of scene graphs is organized a media interchange format. Geometry information of the plurality of scene graphs is updated through the interface to a representation engine. The plurality of objects is streamed based on multi-resolution or multi-tesselation of heterogenous visual geometric objects in each of the scene graphs from among the plurality of scene graphs using the media interchange format.

According to another aspect, a computer system for displaying video content is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include creating an interface to a presentation engine to enable real-time rendering of a plurality of objects whereby the plurality of objects are logically organized together through a plurality of scene graphs, and whereby the plurality of scene graphs is organized a media interchange format. Geometry information of the plurality of scene graphs is updated through the interface to a representation engine. The plurality of objects is streamed based on multi-resolution or multi-tesselation of heterogenous visual geometric objects in each of the scene graphs from among the plurality of scene graphs using the media interchange format.

According to yet another aspect, a computer readable medium for displaying video content is provided. The computer readable medium may include one or more computer-readable storage devices and program instructions stored on at least one of the one or more tangible storage devices, the program instructions executable by a processor. The program instructions are executable by a processor for performing a method that may accordingly include creating an interface to a presentation engine to enable real-time rendering of a plurality of objects whereby the plurality of objects are logically organized together through a plurality of scene graphs, and whereby the plurality of scene graphs is organized a media interchange format. Geometry information of the plurality of scene graphs is updated through the interface to a representation engine. The plurality of objects is streamed based on multi-resolution or multi-tesselation of heterogenous visual geometric objects in each of the scene graphs from among the plurality of scene graphs using the media interchange format.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings

DETAILED DESCRIPTION

Figure 1:
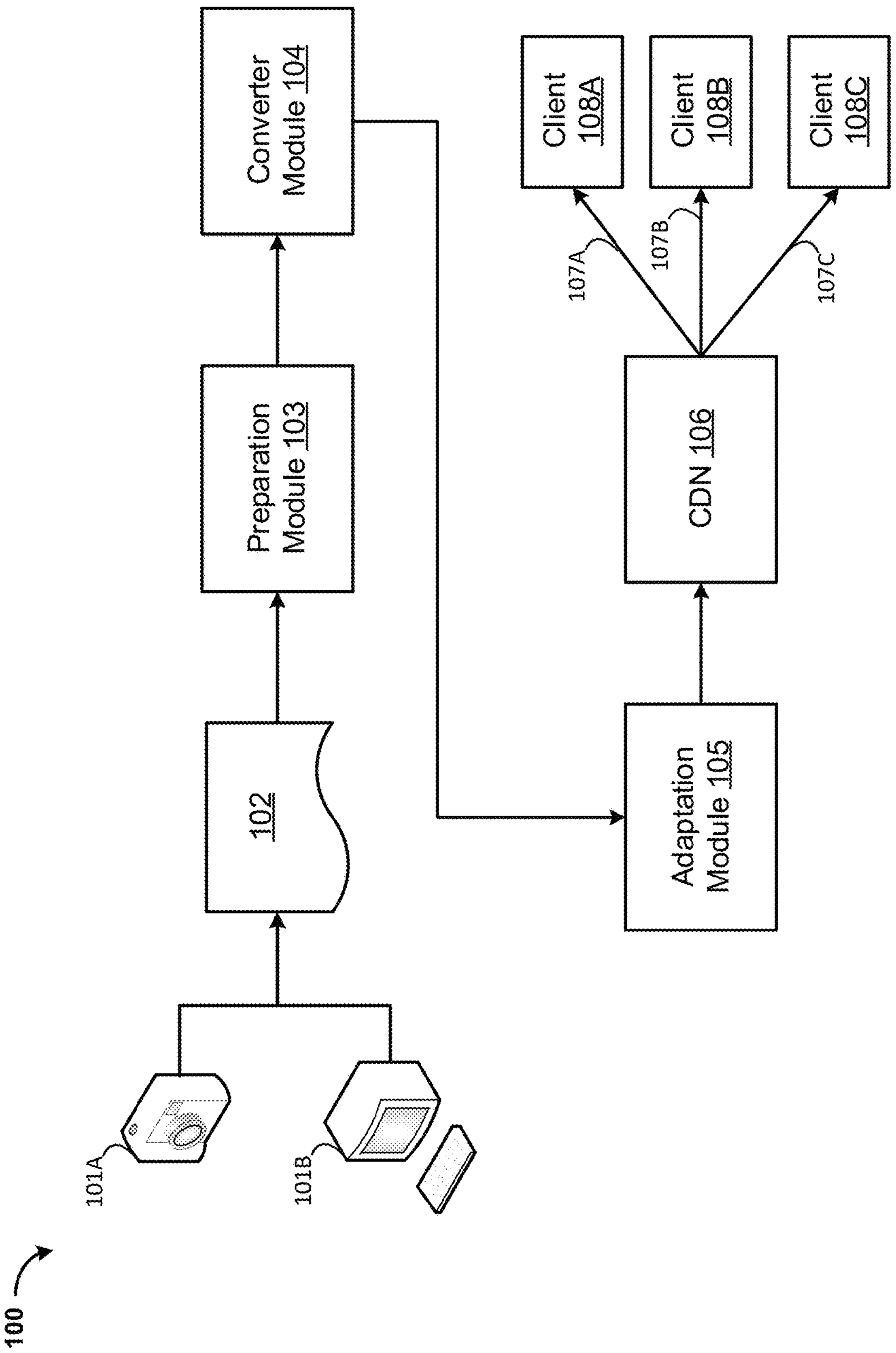
FIG. 1 is a schematic illustration of an end-to-end process of timed legacy media distribution.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Immersive Media can be regarded as one or more types of media that, when presented to a human by an Immersive Media-capable device, stimulates any of the five senses of sight, sound, taste, touch, and hearing, in a way that is, more realistic and consistent with, a human's understanding of experiences within the natural world, i.e., beyond that which would have otherwise been created with legacy media presented by legacy devices. In this context, the term "legacy media" refers to two-dimensional (2D) visual media, either still or moving picture frames, and/or corresponding audio for which the user's ability to interact is limited to pause, play, fast-forward, or rewind; "legacy devices" refers to televisions, laptops, displays, and mobile devices that are limited in their capabilities to the presentation of legacy media. In consumer-facing application scenarios, the presentation device for the Immersive Media (i.e., an Immersive Media-capable device) is a consumer-facing hardware device that is especially equipped with the ability to leverage specific information that is embodied by the Immersive Media such that the device can create a presentation that more closely approximates the human's understanding of, and interaction with, the physical world, i.e., beyond the capabilities of the legacy device to do so.

In the last decade, a number of Immersive Media-capable hardware devices have been introduced into the consumer market, including head-mounted displays, augmented-reality glasses, hand-held controllers, haptic gloves, and game consoles. Likewise, holographic displays and other forms of volumetric displays are poised to emerge within the next decade. Despite the immediate or anticipated availability of these devices, a coherent end-to-end ecosystem for the distribution of Immersive Media has failed to materialize for several reasons. One of those reasons is the lack of a standard representation for Immersive Media that enables the streaming of heterogenous media formats to heterogeneous end-point clients over commercial networks. It may be advantageous, therefore, to use a standard representation for the streaming of Immersive Media over commercial networks to drive heterogenous end-points such as Immersive Media-capable devices that have or are expected to emerge.

It is well understood that legacy devices, supported by legacy media, have achieved wide-scale consumer adoption because they are likewise supported by an ecosystem of legacy media content providers that produce standards-based representations of legacy media, and commercial network service providers that provide network infrastructure to connect legacy devices to sources of standard legacy content. Beyond the role of distributing legacy media over networks, commercial network service providers also facilitate the pairing of legacy client devices with access to legacy content on content distribution networks (CDNs). Once paired with access to suitable forms of content, the legacy client device can then request, or "pull," the legacy content from the content server to the device for presentation to the end user.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

FIG. 1 is an example illustration of the end-to-end process of timed legacy media distribution. In FIG. 1, timed audio-visual content is either captured by a camera or microphone in 101A or generated by a computer in 101B, creating a sequence 102 of 2D images and associated audio that are input to a Preparation Module 103. The output of the Preparation Module 103 is edited content (e.g. for post-production including language translations, subtitles, other editing functions), referred to as a Master Format that is ready to be converted to a standard Mezzanine Format, e.g., for on-demand media, or as a standard Contribution Format, e.g., for live events, by a Converter Module 104. The media is "ingested" by the Commercial Network Service Provider and an Adaptation Module 105 packages the media into various bitrates, temporal resolutions (frame rates) or spatial resolutions (frame sizes) that are packaged into a standard Distribution Format. The resulting adaptations are stored onto a Content Distribution Network 106 from which various clients 108A-C make pull-requests for one or more media adaptations 107A-C to fetch and present the media to the end user. It is important to note that the Master Format may consist of a hybrid of media from both 101A or 101B, and that the format 101A may be obtained in real-time, e.g., such as media that would be obtained from a live sporting event. Furthermore, clients 108A-C are responsible for choosing the specific media adaptations 107A-C that are best suited for the client's configuration and/or for the current network conditions.

Figure 2:
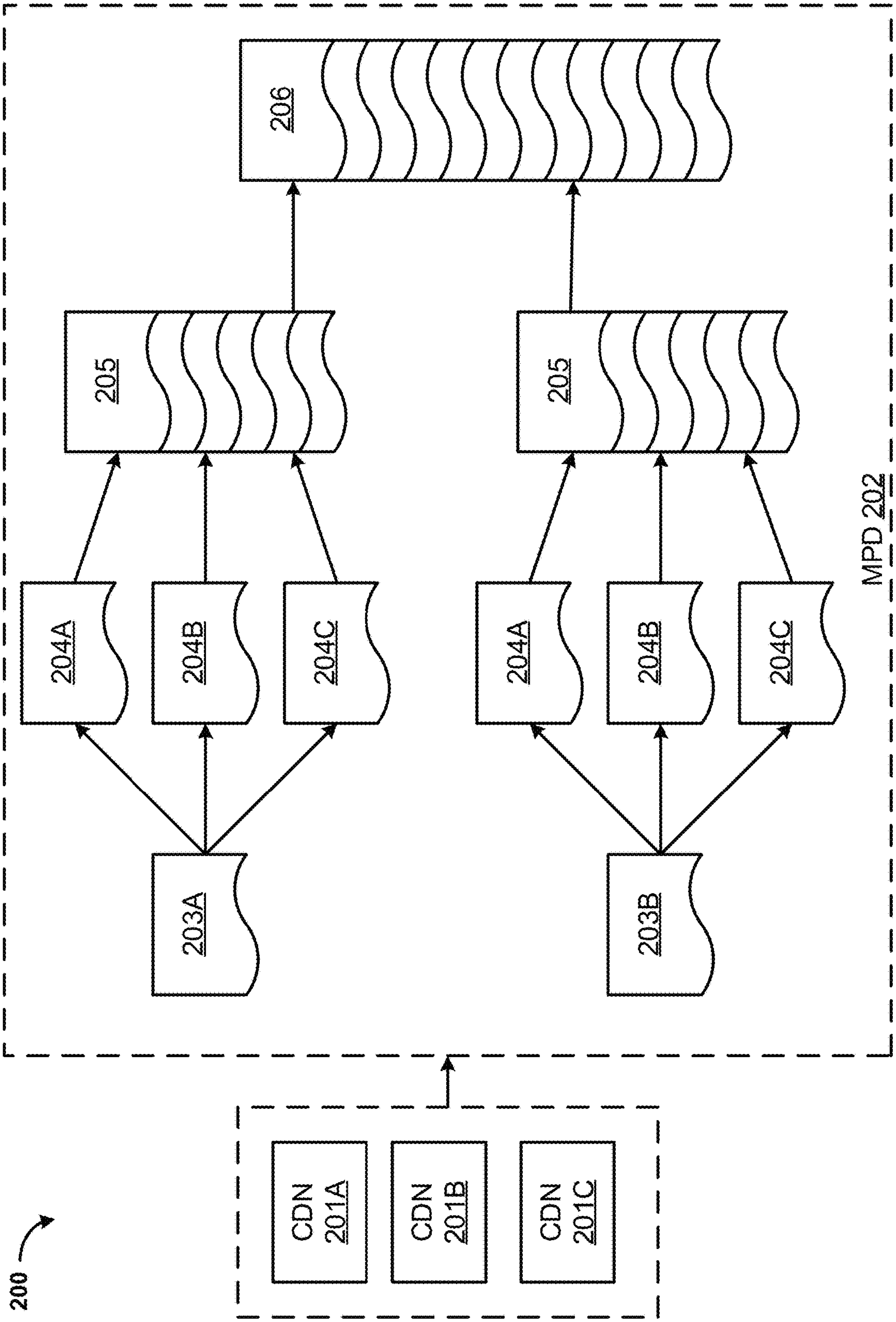
FIG. 2 is a schematic illustration of the standard media format used for streaming of timed legacy media.

FIG. 2 is an example of the standard media format used for distribution of legacy timed media, e.g., video, audio, and supporting metadata (including timed text such as used for subtitles). As noted in item 106 in FIG. 1, the media is stored in a standards-based distribution format onto CDNs 201A-C. The standards-based format is shown as MPD 202, which consists of multiple sections encompassing timed periods, (e.g., Periods 203A,B) with a start and end time corresponding to a clock. Each period from among Periods 203A,B refers to one or more Adaptation Sets 204A-C. Each of the Adaptation Sets 204A-C is generally used for a single type of media, e.g. video, audio, or timed text. For any of the given Periods 203A,B, multiple of the Adaptation Sets 204A-C may be provided, e.g., one for video, and multiple for audio such as used for translations into various languages. Each of the Adaptation Sets 204A-C refers to one or more Representations 205 that provide information about the frame resolution (for video), frame-rate, and bitrate of the media. Multiple Representations 205 may be used to provide access to various media. For example, a Representation 205 each for Ultra-High-Definition, High Definition, or Standard Definition video. Each Representation 205 refers to one or more Segment Files 206 where the media is actually stored for fetching by the client (as shown as 108 in FIG. 1).

Figure 3:
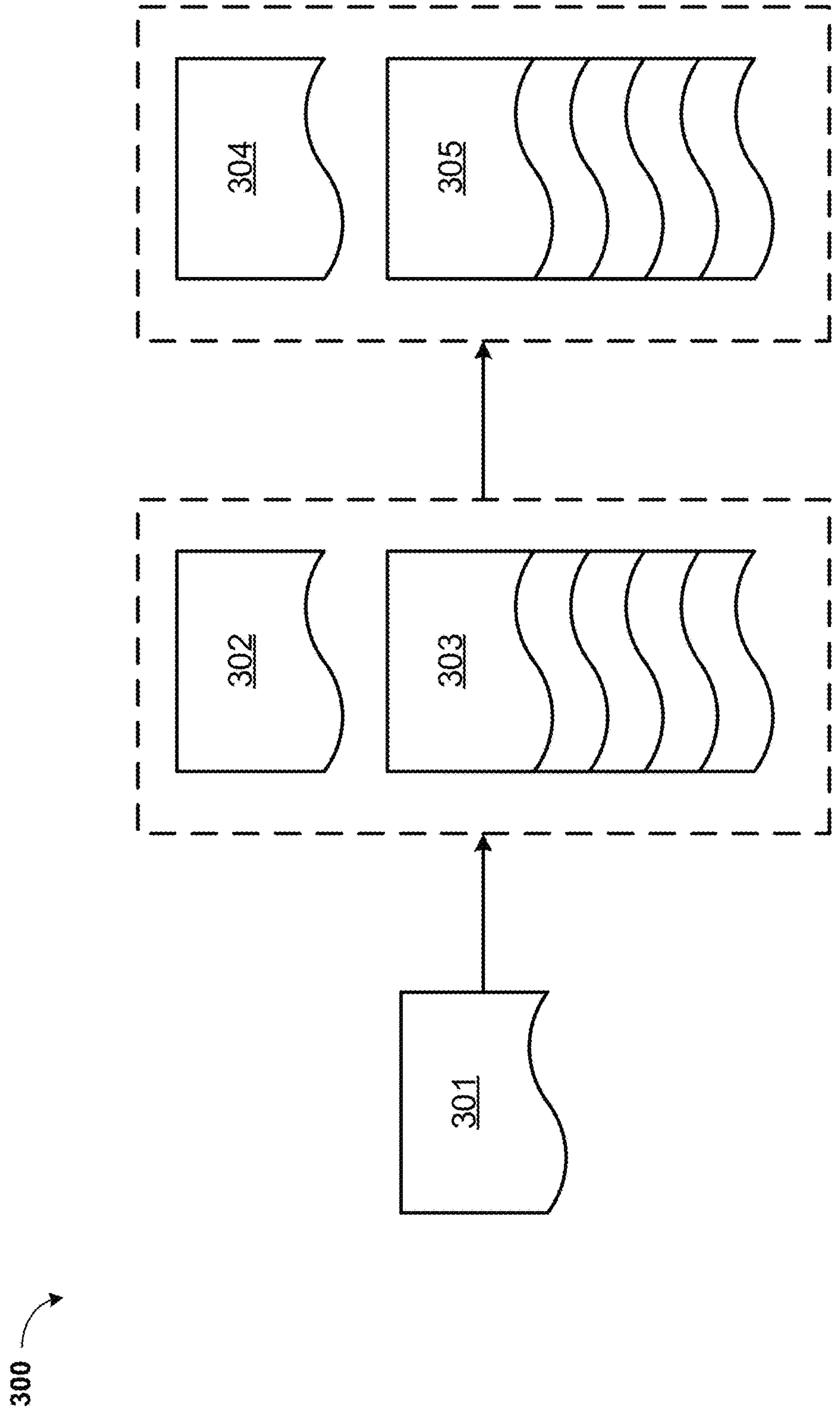
FIG. 3 is a schematic illustration of an embodiment of a data-model for the representation and streaming of timed immersive media.
Figure 4:
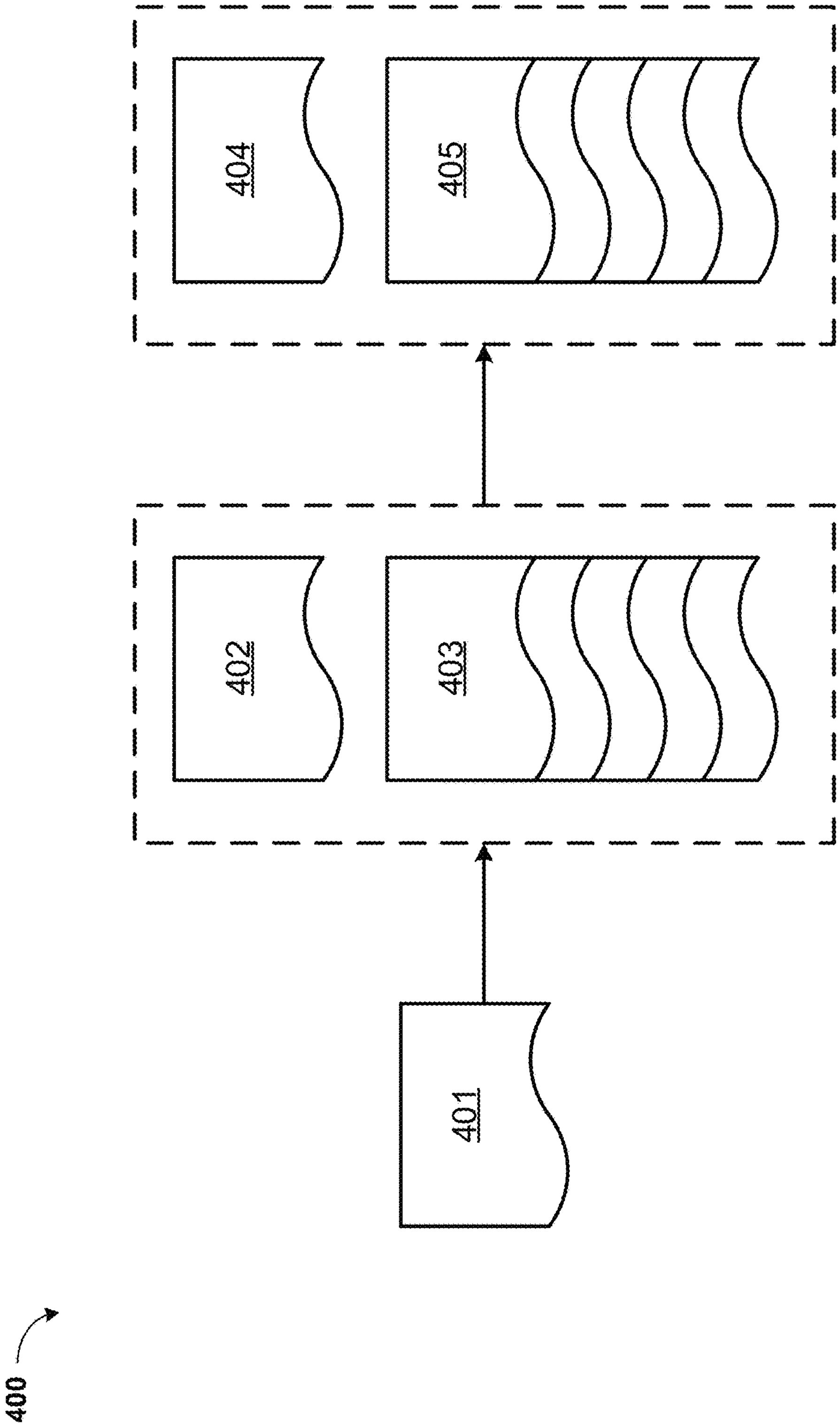
FIG. 4 is a schematic illustration of an embodiment of a data-model for the representation and streaming of untimed immersive media.

FIG. 3 is an example representation of a streamable format for heterogenous immersive media that is timed. FIG. 4 is an example representation of a streamable format for heterogeneous immersive media that is untimed. Both figures refer to a Scene; FIG. 3 refers to Scene 301 for timed media and FIG. 4 refers to Scene 401 for untimed media. In both cases, the Scene may be embodied by a Scene Graph.

Several technologies have been proposed to directly or indirectly support Scene Graphs as a format suitable for various types of immersive media.

1. ORBX® by OTOY

ORBX by OTOY is one of several scene graph technologies that is able to support any type of visual media, timed or untimed, including ray-traceable, legacy (frame-based), volumetric, and other types of synthetic or vector-based visual formats. ORBX is unique from other scene graphs because ORBX provides native support for freely available and/or open source formats for meshes, point clouds, and textures. ORBX is a scene graph that has been intentionally designed with goal of facilitating interchange across multiple vendor technologies that operate on scene graphs. Moreover, ORBX provides a rich materials system, support for Open Shader Language, a robust camera system, and support for Lua Scripts. ORBX is also the basis of the Immersive Technologies Media Format published for license under royalty-free terms by the Immersive Digital Experiences Alliance.

2. Universal Scene Description by Pixar

Universal Scene Description (USD) by Pixar is another well-known, and mature scene graph that is popular in the VFX and professional content production communities. USD is integrated into Nvidia's Omniverse platform which is a set of tools for developers for 3D model creation and rendering with Nvidia's GPUs. A subset of USD was published by Apple and Pixar as USDZ. USDZ is supported by Apple's ARKit.

3. glTF2.0 by Khronos glTF2.0 is the most recent version of the "Graphics Language Transmission Format" specification written by the Khronos 3D Group. This format supports a simple scene graph format that is generally capable of supporting static (untimed) objects in scenes, including "png" and "jpeg" image formats. glTF2.0 supports simple animations, including support for translate, rotate, and scale, of basic shapes described using the glTF primitives, i.e. for geometric objects. glTF2.0 does not support timed media, and hence does not support video nor audio.

4. Unity and Unreal Engines

Unity and Unreal Engines both support rich scene graphs including ORBX and USD for rendering, and are also able to support gaming applications. Both Unity and Unreal are examples of game engines. Both are also capable of performing path tracing for ray-traceable media, e.g., they are able to model the physically correct behavior of light.

5. Advanced Networking Technologies

Network Functions Virtualisation, and MEC are each a standard developed by ETSI, while Software Defined Networks (SDN) is a technology area standardized by the IEEE. Network-Based Media Processing is also the name of a recently completed standard developed by MPEG. Each of these standards contributes features that collectively enable distributed, flexible, and dynamic configuration and adaptation of commercial network resources, especially for the distribution and processing of media at scale across commercial networks.

6. CableLabs

CableLabs' proposal describes "Systems and Methods for Network-Based Media Processing." The proposal describes a "unifying" media interchange format that is "agnostic" to the type(s) of end-point client(s) in the network. The Network-Based Media Processing described therein is not the same as the Network-Based Media Processing specified by MPEG. In the CableLabs proposal, the network employs separated control and data planes that enable the processing and conversion of media in the interchange format to specific formats that ultimately "bind" the media to the specific type of end-point client device. In the MPEG standard, there is no distinction between control and data planes. In the CableLabs proposal, the media in the Media Interchange Format is characterized as "display agnostic," while the resulting converted media, i.e. from the CableLabs' Network-Based Media Processing, is characterized as "display specific." However, the CableLabs specification does not suggest a mechanism for how to stream the media, nor does it provide any information about the organization of the media format, compression of the underlying geometric formats, representation of the functional capabilities of the end-point client, representation of application requirements for the end-point client, or representation of features corresponding to service level agreements between client and network service provider. Moreover, the CableLabs specification does not consider that immersive media consists of media beyond visual or audio formats.

7. Moving Picture Experts Group

ISO/IEC JTC1/SC29/WG11 Moving Picture Experts Group (MPEG) is developing an extension to glTF2.0 to enable the support of timed MPEG media in glTF. As glTF is currently used for rendering of static resources, the MPEG effort to extend glTF will not naturally fit into existing applications or ecosystems where glTF is widely deployed. Likewise, the current ecosystem for timed media does not employ scene graphs for the distribution of timed media. The fact that MPEG is considering the use of a scene graph for support of timed immersive media indicates that MPEG has acknowledged the importance of a scene graph for organization of independent volumetric objects, however in its current designs, MPEG plans to package the scene graph(s) and the individual objects referenced by the graph into ISO Base Media File Format files. This is especially limiting because in terms of a data hierarchy, the scene graph container should be the container wrapper for both MPEG media and non-MPEG media, and hence should not be positioned at the same level (in terms of logical data hierarchy) as the MPEG media.

MPEG-I is a suite of standards currently in development by MPEG. As of MPEG 130, the suite consists of 14 individual specifications known as "Parts." Part 14 of the suite is a first attempt by MPEG to create a data structure that can support both MPEG media and non-MPEG media. The most current draft of Part 14 is available from MPEG 130 as N19070 which is entitled "Scene Description for MPEG Media." Requirements for the scene description are in N18339.

In its proposal submitted to MPEG 130 in M53364, Qualcomm proposed a design for the scene graph to be updated using the JSON Patch Protocol. As MPEG media is being applied to the scene graph, the proposal does not support the updating of scene graphs for media that is not MPEG media. That is, the proposal in M53364 works only for updates that pertain to MPEG media, and does not support updates of the scene graph for both timed (e.g., based on MPEG standards) or untimed media (not based on MPEG standards).

Referring back to FIG. 1, despite the fact that each of the clients 108A-C in FIG. 1 are embodied by different form factors: e.g., fixed displays, mobile displays, laptop displays, head-mounted displays, each of these various form factors consumes media that is quite homogenous in its composition. That is, each of the media adaptations 107 are fundamentally comprised of 2D video and corresponding audio signals that are compressed and formatted according to legacy standard compression schemes for distribution of timed 2D video and corresponding audio. Commonly used compression schemes for video include de-jure standards developed by the ISO/IEC Moving Picture Experts Group (MPEG), Alliance for Open Media (AOM), or Society of Motion Pictures and Television Engineers (SMPTE). Commonly used compression schemes for audio include de-jure standards developed by MPEG, SMPTE, ETSI, and de-facto standards developed by Dolby Inc., and DTS, Inc (now wholly owned by Xperi, Inc.). Between the widely-used compression formats for video, including MPEG, SMPTE, and AOM formats, the compressed video bitstream is also homogenous, utilizing a common architecture and a relatively common set of tools for eliminating spatial redundancies that exist within individual picture frames, and temporal redundancies that exist between individual picture frames. Likewise, between audio formats, a common architecture and common set of tools also exists.

The consequence of this homogeneity of audio-visual compression formats and homogeneity of client end-points is the creation of a large barrier of entry for the commercial distribution of heterogenous immersive media formats that do not necessarily utilize the same visual and audio architectures in their representations. This problem manifests itself, in particular, with visual information because it is the transport of visual information that currently consumes most of the resources and capacity of the existing Internet.

However, as advanced network technologies such as 5G for mobile networks, and fibre optical cable for fixed networks are deployed, the capacity and capabilities of commercial networks likewise improves because such advanced network infrastructures can support transport and delivery of increasingly larger amounts of visual information. Furthermore, network infrastructure management technologies such as Multi-access Edge Computing (MEC), Software Defined Networks (SDN), and Network Functions Virtualization (NFV), enable commercial network service providers to flexibly configure their network infrastructure to adapt to changes in demand for certain network resources, e.g., to respond to dynamic increases or decreases in demand for network throughputs, network speeds, roundtrip latency, and compute resources. Moreover, this inherent ability to adapt to dynamic network requirements likewise facilitates the ability of networks to support a variety of immersive media applications with potentially heterogenous visual media formats for heterogenous client end-points.

Immersive Media applications themselves may also have varying requirements for network resources including gaming applications which require significantly lower network latencies to respond to real-time updates in the state of the game, telepresence applications which have symmetric throughput requirements for both the uplink and downlink portions of the network, and passive viewing applications that may have increased demand for downlink resources depending on the type of client end-point display that is consuming the data. In general, any consumer-facing application may be supported by a variety of client end-points with various onboard-client capabilities for storage, compute, and power, and likewise various requirements for particular media representations.

For example, a fixed holographic display that serves as a client end-point will require access to visual information represented in a holographic format, whereas a virtual-reality head mounted display that serves as a client end-point will require access to visual information represented in a stereoscopic omnidirectional format. Similarly, augmented reality displays will require access to visual information represented as individual volumetric objects.

Currently, large-scale streaming and distribution of media over commercial networks is limited to media compressed and represented in legacy 2D media formats. This limitation constrains the deployment of immersive consumer end-point devices and likewise, immersive applications, to those that can leverage legacy 2D visual media formats to create an immersive experience constrained by technologies for 2D formats. End-point clients such as light field displays (also known as holographic displays) that require access to visual information representing volumes of light cannot be supported. Likewise, any end-point client that requires access to ray-traceable or photorealistic visual information cannot be supported.

Despite the emergence of advanced network technologies to dynamically support and adapt to a wide variety of network conditions and application requirements; despite the availability of consumer-facing Immersive Media-capable devices, a coherent ecosystem for the broad distribution of heterogeneous Immersive Media to a set, of heterogeneous Immersive Media-capable devices, does not exist. Essential components for such a coherent ecosystem remain to be defined. These elements include a unifying architecture coupled with a unifying media format that will facilitate the development of a coherent ecosystem much like that which currently exists for legacy media. Such a unifying architecture and data model that demonstrates that it can be streamed across commercial networks for support of interactive applications and heterogeneous end-point clients that require access to heterogenous media formats including: legacy 2D information, individual volumetric object information, volumetric scene information, ray-traceable visual information, timed or untimed media, or some combination of each of these visual formats, is essential to break past the barrier of entry that exists today for Immersive Media.

Embodiments of the instant application describe a heterogenous media framework, and corresponding media representation for the streaming of heterogenous media to heterogenous end-point client devices for the support of both passive and interactive media experiences suitable for deployment over commercial networks. The underlying network infrastructure, on top of which this invention may be deployed, may optionally be a MEC-based or CDN-based network.

The described extends previous immersive media technologies with the following:

1. The media that is streamed according to the encompassing media format is not limited to legacy visual and audio media, but may include any type of media information that is capable of producing a signal that interacts with machines to stimulate the human senses for sight, sound, taste, touch, and smell.

2. The encompassing media format is demonstrably streamable by enabling a manifest and layered representation that enables the client to receive only a minimum amount of information, e.g., in the base layer representation for the objects, so that the client can produce a simplified representation of the scene before it receives additional information, e.g., in the enhancement layers for the objects, that refine the simplified representation.

3. The media that is streamed according to the encompassing media format can be both timed or untimed media, or a mixture of both.

4. The encompassing media format is furthermore streamable by enabling a layered representation for media objects by use of a base layer and enhancement layer architecture. In one example, the separate base layer and enhancement layers are computed by application of multi-resolution or multi-tesselation analysis techniques for media objects in each scene. This is analogous to the progressively rendered image formats specified in ISO/IEC 10918-1 (JPEG), and ISO/IEC 15444-1 (JPEG2000), but not limited to raster-based visual formats. In an example embodiment, a progressive representation for a geometric object could be a multi-resolution representation of the object computed using wavelet analysis.

In another example of the layered representation of the media format, the enhancement layers apply different attributes to the base layer, such as refining the material properties of the surface of a visual object that is represented by the base layer. In yet another example, the attributes may refine the texture of the surface of the base layer object, such as changing the surface from a smooth to a porous texture, or from a matted surface to a glossy surface.

In yet another example of the layered representation, the surfaces of one or more visual objects in the scene may be altered from being Lambertian to being ray-traceable.

In yet another example of the layered representation, the network will distribute the base-layer representation to the client so that the client may create a nominal presentation of the scene while the client awaits the transmission of additional enhancement layers to refine the resolution or other characteristics of the base representation.

5. The resolution of the attributes or refining information in the enhancement layers is not explicitly coupled with the resolution of the object in the base layer as it is today in existing MPEG video and JPEG image standards.

6. The encompassing media format supports any type of information media that can be presented or actuated by a presentation device or machine, thereby enabling the support of heterogenous media formats to heterogenous client end-points. In one embodiment of a network that distributes the media format, the network will first query the client end-point to determine the client's capabilities, and if the client is not capable of meaningfully ingesting the media representation then the network will either remove the layers of attributes that are not supported by the client, or transcode the media from its current format into a format that is suitable for the client end-point. In one example of such transcoding, the network would convert a volumetric visual media asset into a 2D representation of the same visual asset, by use of a Network-Based Media Processing protocol.

7. The manifest for a complete or partially-complete immersive experience (live streaming event, game, or playback of on-demand asset) is organized by scenes which is the minimal amount of information that rendering and game engines can currently ingest in order to create a presentation. The manifest includes a list of the individual scenes that are to be rendered for the entirety of the immersive experience requested by the client. Associated with each scene are one or more representations of the geometric objects within the scene corresponding to streamable versions of the scene geometry. One embodiment of a scene representation refers to a low resolution version of the geometric objects for the scene. Another embodiment of the same scene refers to an enhancement layer for the low resolution representation of the scene to add additional detail, or increase tessellation, to the geometric objects of the same scene. As described above, each scene may have more than one enhancement layer to increase the detail of the geometric objects of the scene in a progressive manner.

8. Each layer of the media objects that are referenced within a scene is associated with a token (e.g., URI) that points to the address of where the resource can be accessed within the network. Such resources are analogous to CDN's where the content may be fetched by the client.

9. The token for a representation of a geometric object may point to a location within the network or to a location within the client. That is, the client may signal to the network that its resources are available to the network for network-based media processing.

FIG. 3 describes an embodiment of the encompassing media format for timed media as follows. The Timed Scene Manifest includes a list of information corresponding to one or more scenes 301. The Scene 301 refers to a list of Components 302 that separately describe processing information and types of media assets that comprise Scene 301. Components 302 refer to Assets 303, such as visual, audio, haptic, and olfactory assets, that further refer to Base Layers 304 and Attribute Enhancement Layers 305, such as resolution, temporal, and material enhancement layers.

FIG. 4 describes an embodiment of the encompassing media format for untimed media as follows. The Scene Information 401 is not associated with a start and end duration according to a clock. Scene Information 401 refers to a list of Components 402 that separately describe processing information and types of media assets that comprise Scene 401. Components 402 refer to Assets 403 that further refer to Base Layers 404 and Attribute Enhancement Layers 405. Furthermore, Scene 401 refers to other scenes that are for untimed media. Scene 401 also refer to a timed media scene.

The techniques for representing and streaming heterogeneous immersive media described above, can be implemented as computer software using computer-readable instructions and physically stored in one or more computer-readable media. For example, FIG. 5 shows a computer system 500 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 5:
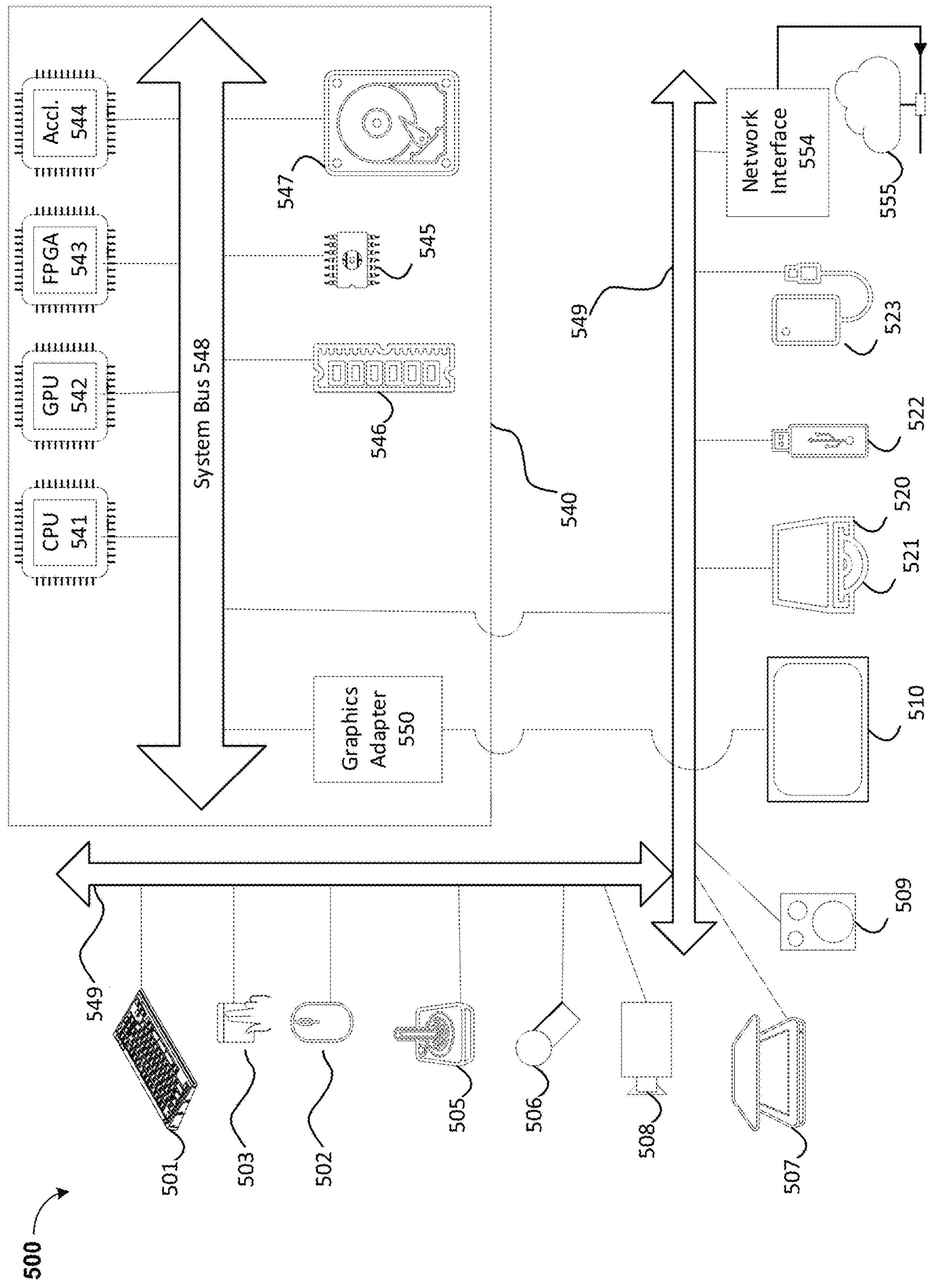
FIG. 5 is a system diagram of an embodiment of a data-model for the representation and streaming of untimed immersive media.

The components shown in FIG. 5 for computer system 500 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 500.

Computer system 500 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 501, mouse 502, trackpad 503, touch screen 510, data-glove (not depicted), joystick 505, microphone 506, scanner 507, camera 508.

Computer system 500 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 510, data-glove (not depicted), or joystick 505, but there can also be tactile feedback devices that do not serve as input devices), audio output devices (such as: speakers 509, headphones (not depicted)), visual output devices (such as screens 510 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 500 can also include human accessible storage devices and their associated media such as optical media including CD/DVD ROM/RW 520 with CD/DVD or the like media 521, thumb-drive 522, removable hard drive or solid state drive 523, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 500 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (549) (such as, for example USB ports of the computer system 500; others are commonly integrated into the core of the computer system 500 by attachment to a system bus as described below (for example Ethernet interface into a PC computer system or cellular network interface into a smartphone computer system). Using any of these networks, computer system 500 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 540 of the computer system 500.

The core 540 can include one or more Central Processing Units (CPU) 541, Graphics Processing Units (GPU) 542, specialized programmable processing units in the form of Field Programmable Gate Areas (FPGA) 543, hardware accelerators for certain tasks 544, and so forth. These devices, along with Read-only memory (ROM) 545, Random-access memory 546, internal mass storage such as internal non-user accessible hard drives, SSDs, and the like 547, may be connected through a system bus 548. In some computer systems, the system bus 548 can be accessible in the form of one or more physical plugs to enable extensions by additional CPUs, GPU, and the like. The peripheral devices can be attached either directly to the core's system bus 548, or through a peripheral bus 549. Architectures for a peripheral bus include PCI, USB, and the like.

CPUs 541, GPUs 542, FPGAs 543, and accelerators 544 can execute certain instructions that, in combination, can make up the aforementioned computer code. That computer code can be stored in ROM 545 or RAM 546. Transitional data can be also be stored in RAM 546, whereas permanent data can be stored for example, in the internal mass storage 547. Fast storage and retrieve to any of the memory devices can be enabled through the use of cache memory, that can be closely associated with one or more CPU 541, GPU 542, mass storage 547, ROM 545, RAM 546, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 500, and specifically the core 540 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 540 that are of non-transitory nature, such as core-internal mass storage 547 or ROM 545. The software implementing various embodiments of the present disclosure can be stored in such devices and executed by core 540. A computer-readable medium can include one or more memory devices or chips, according to particular needs. The software can cause the core 540 and specifically the processors therein (including CPU, GPU, FPGA, and the like) to execute particular processes or particular parts of particular processes described herein, including defining data structures stored in RAM 546 and modifying such data structures according to the processes defined by the software. In addition or as an alternative, the computer system can provide functionality as a result of logic hardwired or otherwise embodied in a circuit (for example: accelerator 544), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Definitions

Scene graph: general data structure commonly used by vector-based graphics editing applications and modern computer games, which arranges the logical and often (but not necessarily) spatial representation of a graphical scene; a collection of nodes and vertices in a graph structure.

Node: fundamental element of the scene graph comprised of information related to the logical or spatial or temporal representation of visual, audio, haptic, olfactory, gustatory, or related processing information; each node shall have at most one output edge, zero or more input edges, and at least one edge (either input or output) connected to it.

Base Layer: a nominal representation of an asset, usually formulated to minimize the compute resources or time needed to render the asset, or the time to transmit the asset over a network.

Enhancement Layer: a set of information that when applied to the base layer representation of an asset, augments the base layer to include features or capabilities that are not supported in the base layer.

Attribute: metadata associated with a node used to describe a particular characteristic or feature of that node either in a canonical or more complex form (e.g. in terms of another node).

Container: a serialized format to store and exchange information to represent all natural, all synthetic, or a mixture of synthetic and natural scenes including a scene graph and all of the media resources that are required for rendering of the scene Serialization: the process of translating data structures or object state into a format that can be stored (for example, in a file or memory buffer) or transmitted (for example, across a network connection link) and reconstructed later (possibly in a different computer environment). When the resulting series of bits is reread according to the serialization format, it can be used to create a semantically identical clone of the original object.

Renderer: a (typically software-based) application or process, based on a selective mixture of disciplines related to: acoustic physics, light physics, visual perception, audio perception, mathematics, and software development, that, given an input scene graph and asset container, emits a typically visual and/or audio signal suitable for presentation on a targeted device or conforming to the desired properties as specified by attributes of a render target node in the scene graph. For visual-based media assets, a renderer may emit a visual signal suitable for a targeted display, or for storage as an intermediate asset (e.g. repackaged into another container i.e. used in a series of rendering processes in a graphics pipeline); for audio-based media assets, a renderer may emit an audio signal for presentation in a multi-channel loudspeaker and/or binauralized headphones, or for repackaging into another (output) container. Popular examples of renderers include: Unity, Unreal.

Evaluate: produces a result (e.g. similar to evaluation of a Document Object Model for a webpage) that causes the output to move from an abstract to a concrete result.

Scripting language: An interpreted programming language that can be executed by a renderer at runtime to process dynamic input and variable state changes made to the scene graph nodes, which affect rendering and evaluation of spatial and temporal object topology (including physical forces, constraints, IK, deformation, collisions), and energy propagation and transport (light, sound).

Shader: a type of computer program that was originally used for shading (the production of appropriate levels of light, darkness, and color within an image) but which now performs a variety of specialized functions in various fields of computer graphics special effects or does video post-processing unrelated to shading, or even functions unrelated to graphics at all.

Path Tracing: a computer graphics method of rendering three-dimensional scenes such that the illumination of the scene is faithful to reality.

Timed media: Media that is ordered by time; e.g., with a start and end time according to a particular clock.

Untimed media: Media that is organized by spatial, logical, or temporal relationships; e.g., as in an interactive experience that is realized according to the actions taken by the user(s).

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of presenting immersive media and executable by a processor, the method comprising:

creating an interface to a presentation engine to enable real-time rendering of a plurality of assets, wherein the plurality of assets are logically organized together through a plurality of scene graphs comprising, in a media interchange format, scene graph information comprising a collection of nodes comprising a first node, a second node, a third node, and a fourth node, wherein the first node comprises an audio asset, wherein the second node comprises a tactile asset, the third node comprises an olfactory asset, and the fourth node comprises a gustatory asset;

updating geometry information of the plurality of scene graphs through the interface to a representation engine, at least one of the plurality of scene graphs representing at least an untimed media and, of the untimed media and a timed media, any of just the untimed media and a combination of the timed media and the untimed media; and streaming requested media, corresponding to the immersive media and the plurality of assets, based on multi-resolution or multi-tesselation of heterogenous visual geometric assets in each of the scene graphs including the at least one of the scene graphs representing at least the untimed media.

2. The method of claim 1, wherein streaming the requested media, corresponding to the immersive media and the plurality of assets and based on multi-resolution or multi-tesselation of heterogenous visual geometric assets in each of the scene graphs, is further based on the media interchange format and is by at least distributing, based on the scene graph information, a base-layer representation and subsequently one or more enhancement layers configured to refine the base-layer representation, wherein the scene graphs are organized into the media interchange format, and wherein updating geometry information of the plurality of scene graphs through the interface to a representation engine comprises updating the geometry information into the media interchange format.

3. The method of claim 1, wherein the scene graph information establishes one or more of a logical relationship, a spatial relationship, and a temporal relationship with the plurality of visual geometric assets.

4. The method of claim 3, wherein updating the geometry information of the scene graphs comprises increasing a resolution of the plurality of assets in a multi-resolution representation of at least one of the scene graphs.

5. The method of claim 3, further comprising at least one of:

interacting with the plurality of assets in a scene graph, of the scene graphs, through the interface to the representation engine;

updating a position of a camera through the interface to the representation engine;

creating a representation for Immersive Media in a scene graph, of the scene graphs, wherein the scene graph creates logical, spatial, and temporal relationships between individual and heterogeneous forms of Immersive Media, and wherein the representation includes media capable of interacting with or stimulating one or more of human sensory systems comprising sight, hearing, touch, taste, and smell; and associating each geometric asset that is referenced within a scene in a scene graph, of the scene graphs, with a token that points to an address of where resource is accessible within a network.

6. The method of claim 5, wherein the token comprises a universal resource identifier (URI), wherein content of the resource is fetched by a client by accessing through the URI, wherein the token points to one of (1) a location within the network, and (2) a location within a client.

7. The method of claim 1, further comprising at least one of:

creating a network-provided representations for a geometric asset that exist within the network or client, wherein the network-provided representation persists across a plurality of scene boundaries, wherein responsive to the geometric asset existing on the client that is managed by the network, the network manages persistence and availability of the geometric asset; and maintaining, by a network media resource manager, availability of a particular representation for a geometric asset, of the assets, in a scene graph, of the scene graphs, at a particular location within a network prior to a client's receipt of the scene graph, wherein the scene graph references the particular representation of the geometric asset.

8. A computer system for presenting immersive media, the computer system comprising:

one or more computer-readable non-transitory storage media configured to store computer program code; and one or more computer processors configured to access said computer program code and operate as instructed by said computer program code, said computer program code including:

creating code configured to cause the one or more computer processors to create an interface to a presentation engine to enable real-time rendering of a plurality of assets, wherein the plurality of assets are logically organized together through a plurality of scene graphs comprising, in a media interchange format, scene graph information comprising a collection of nodes comprising a first node, a second node, a third node, and a fourth node, wherein the first node comprises an audio asset, wherein the second node comprises a tactile asset, the third node comprises an olfactory asset, and the fourth node comprises a gustatory asset;

updating code configured to cause the one or more computer processors to update geometry information of the plurality of scene graphs through the interface to a representation engine, at least one of the plurality of scene graphs representing at least an untimed media and, of the untimed media and a timed media, any of just the untimed media and a combination of the timed media and the untimed media; and streaming code configured to cause the one or more computer processors to stream requested media, corresponding to the immersive media and the plurality of assets, based on multi-resolution or multi-tesselation of heterogenous visual geometric assets in each of the scene graphs including the at least one of the scene graphs representing at least the untimed media.

9. The apparatus of claim 8, wherein streaming the requested media, corresponding to the immersive media and the plurality of assets based on multi-resolution or multi-tesselation of heterogenous visual geometric assets in each of the scene graphs, is further based on the media interchange format and is by at least distributing, based on the scene graph information, a base-layer representation and subsequently one or more enhancement layers configured to refine the base-layer representation, wherein the scene graphs are organized into the media interchange format, and wherein updating geometry information of the plurality of scene graphs through the interface to a representation engine comprises updating the geometry information into the media interchange format.

10. The apparatus of claim 9, wherein updating the geometry information of the scene graphs comprises increasing a resolution of the plurality of assets in a multi-resolution representation of at least one of the scene graphs.

11. The apparatus of claim 9, wherein the at least one or more computer processors are further configured to access said computer code and operate as instructed by said computer code to implement at least one of:

interacting with the plurality of assets in a scene graph, of the scene graphs, through the interface to the representation engine;

updating a position of a camera through the interface to the representation engine;

creating a representation for Immersive Media in a scene graph, of the scene graphs, wherein the scene graph creates logical, spatial, and temporal relationships between individual and heterogeneous forms of Immersive Media, and wherein the representation includes media capable of interacting with or stimulating one or more of human sensory systems comprising sight, hearing, touch, taste, and smell; and associating each geometric asset that is referenced within a scene in a scene graph, of the scene graphs, with a token that points to an address of where resource is accessible within a network.

12. The apparatus of claim 11, wherein the token comprises a universal resource identifier (URI), wherein content of the resource is fetched by a client by accessing through the URI, wherein the token points to one of (1) a location within the network, and (2) a location within a client.

13. The apparatus of claim 8, wherein the scene graph information establishes one or more of a logical relationship, a spatial relationship, and a temporal relationship with the plurality of visual geometric assets.

14. The apparatus of claim 8, wherein the at least one or more computer processors are further configured to access said computer code and operate as instructed by said computer code to implement:

creating a network-provided representations for a geometric asset that exist within the network or client, wherein the network-provided representation persists across a plurality of scene boundaries, wherein responsive to the geometric asset existing on the client that is managed by the network, the network manages persistence and availability of the geometric asset; and maintaining, by a network media resource manager, availability of a particular representation for a geometric asset, of the assets, in a scene graph, of the scene graphs, at a particular location within a network prior to a client's receipt of the scene graph, wherein the scene graph references the particular representation of the geometric asset.

15. A non-transitory computer readable medium having stored thereon a computer program for presenting immersive media, the computer program configured to cause one or more computer processors to:

create an interface to a presentation engine to enable real-time rendering of a plurality of assets, wherein the plurality of assets are logically organized together through a plurality of scene graphs and the plurality of scene graphs comprising, in a media interchange format, scene graph information comprising a collection of nodes comprising a first node, a second node, a third node, and a fourth node, wherein the first node comprises an audio asset, wherein the second node comprises a tactile asset, the third node comprises an olfactory asset, and the fourth node comprises a gustatory asset;

update geometry information of the plurality of scene graphs through the interface to a representation engine, at least one of the plurality of scene graphs representing at least an untimed media and, of the untimed media and a timed media, any of just the untimed media and a combination of the timed media and the untimed media; and stream requested media, corresponding to the immersive media and the plurality of assets, based on multi-resolution or multi-tesselation of heterogenous visual geometric assets in each of the scene graphs, including the at least one of the scene graphs representing at least the untimed media.

16. The non-transitory computer readable medium of claim 15, wherein streaming the requested media, corresponding to the immersive media and the plurality of assets based on multi-resolution or multi-tesselation of heterogenous visual geometric assets in each of the scene graphs, is further based on the media interchange format and is by at least distributing, based on the scene graph information, a base-layer representation and subsequently one or more enhancement layers configured to refine the base-layer representation, wherein the scene graphs are organized into the media interchange format, and wherein updating geometry information of the plurality of scene graphs through the interface to a representation engine comprises updating the geometry information into the media interchange format.

17. The non-transitory computer readable medium of claim 15, wherein the scene graph information establishes one or more of a logical relationship, a spatial relationship, and a temporal relationship with the plurality of visual geometric assets.

18. The non-transitory computer readable medium of claim 17, wherein updating the geometry information of the scene graphs comprises increasing a resolution of the plurality of assets in a multi-resolution representation of at least one of the scene graphs.

19. The non-transitory computer readable medium of claim 17, the computer program is further configured to cause the one or more computer processors to implement at least one of:

interacting with the plurality of assets in a scene graph, of the scene graphs, through the interface to the representation engine;

updating a position of a camera through the interface to the representation engine;

creating a representation for Immersive Media in a scene graph, of the scene graphs, wherein the scene graph creates logical, spatial, and temporal relationships between individual and heterogeneous forms of Immersive Media, and wherein the representation includes media capable of interacting with or stimulating one or more of human sensory systems comprising sight, hearing, touch, taste, and smell; and associating each geometric asset that is referenced within a scene in a scene graph, of the scene graphs, with a token that points to an address of where resource is accessible within a network, wherein the token comprises a universal resource identifier (URI), wherein content of the resource is fetched by a client by accessing through the URI, wherein the token points to one of (1) a location within the network, and (2) a location within a client.

20. The non-transitory computer readable medium of claim 15, the computer program is further configured to cause the one or more computer processors to implement at least one of:

creating a network-provided representations for a geometric asset that exist within the network or client, wherein the network-provided representation persists across a plurality of scene boundaries, wherein responsive to the geometric asset existing on the client that is managed by the network, the network manages persistence and availability of the geometric asset; and maintaining, by a network media resource manager, availability of a particular representation for a geometric asset, of the assets, in a scene graph, of the scene graphs, at a particular location within a network prior to a client's receipt of the scene graph, wherein the scene graph references the particular representation of the geometric asset.

* * * * *